United States Patent
Breisinger et al.

(10) Patent No.: US 11,345,383 B2
(45) Date of Patent: May 31, 2022

(54) DRIVING SYSTEM FOR AN AUTOMATED DRIVE WITH A STEERING WHEEL DISPLAY FOR DISPLAYING THE DISTANCE TO AN END POINT OF THE AUTOMATED DRIVE, AND METHOD FOR DISPLAYING THE DISTANCE

(71) Applicant: Bayerische Motoren Werke Aktiengesellschaft, Munich (DE)

(72) Inventors: Marc Breisinger, Munich (DE); Nora Broy, Munich (DE); Julian Eichhorn, Menlo Park, CA (US); Sebastian Hergeth, Munich (DE); Philipp Kerschbaum, Munich (DE); Hermann Kuenzner, Freising (DE); Lutz Lorenz, Deisenhofen (DE); Stephan Mueller, Munich (DE); Julia Niemann, Berlin (DE); Frederik Platten, Munich (DE); Wolfgang Spiessl, Munich (DE); Philipp Suessenguth, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 403 days.

(21) Appl. No.: 16/691,918

(22) Filed: Nov. 22, 2019

(65) Prior Publication Data
US 2020/0086907 A1    Mar. 19, 2020

Related U.S. Application Data

(63) Continuation of application No. PCT/EP2018/063346, filed on May 22, 2018.

(30) Foreign Application Priority Data

May 23, 2017  (DE) ..................... 10 2017 208 763.3

(51) Int. Cl.
*G06F 17/00*  (2019.01)
*B62D 1/04*   (2006.01)
(Continued)

(52) U.S. Cl.
CPC .............. *B62D 1/046* (2013.01); *B60K 35/00* (2013.01); *B60Q 3/283* (2017.02); *B60Q 9/00* (2013.01);
(Continued)

(58) Field of Classification Search
CPC ........ B62D 1/046; B62D 1/06; B62D 15/029; B60K 35/00; B60K 2370/188;
(Continued)

(56) References Cited

U.S. PATENT DOCUMENTS

| 8,260,482 B1 * | 9/2012 | Szybalski | ............. B60W 10/04 701/410 |
| 8,775,023 B2 * | 7/2014 | Frojdh | .................. G06F 3/0304 701/41 |

(Continued)

FOREIGN PATENT DOCUMENTS

| CN | 1771158 A | 5/2006 |
| CN | 201998981 U | 10/2011 |

(Continued)

OTHER PUBLICATIONS

Chinese-language Office Action issued in Chinese Application No. 201880028460.1 dated Jun. 30, 2021 with English translation (19 pages).

(Continued)

*Primary Examiner* — Ronnie M Mancho
(74) *Attorney, Agent, or Firm* — Crowell & Moring LLP

(57) ABSTRACT

A driving system for an automated drive for a motor vehicle includes a steering wheel display with a lighting strip structure. The lighting strip structure of the steering wheel (Continued)

display is luminous in a defined lighting color for a duration which can be modified according to the actuation. The driving system is designed to control the steering wheel display such that the lighting strip structure is luminous in the lighting color over a starting length during the automated drive. Upon approaching an end of the automated drive lying ahead, the driving system determines that the vehicle has approached an end point of the automated drive lying ahead in such a manner that a specified approach condition has been satisfied. In response thereto, the steering wheel display is actuated such that the lighting strip structure is luminous in the lighting color with a successively decreasing length starting from the starting length as the distance to the end point of the automated drive decreases successively in order to prepare the driver to completely or at least partly take over control of the vehicle again.

11 Claims, 3 Drawing Sheets

(51) Int. Cl.
| | | |
|---|---|---|
| *B60Q 3/283* | (2017.01) | |
| *B60K 35/00* | (2006.01) | |
| *B60Q 9/00* | (2006.01) | |
| *G05D 1/00* | (2006.01) | |

(52) U.S. Cl.
CPC ...... *G05D 1/0061* (2013.01); *B60K 2370/188* (2019.05); *B60K 2370/338* (2019.05); *B60K 2370/782* (2019.05)

(58) Field of Classification Search
CPC ........ B60K 2370/338; B60K 2370/782; B60K 2370/168; B60K 2370/175; B60K 2370/193; B60Q 3/283; B60Q 9/00; G05D 1/0061; B60W 2050/146
USPC .......................................................... 701/41
See application file for complete search history.

(56) References Cited

U.S. PATENT DOCUMENTS

| | | | | |
|---|---|---|---|---|
| 8,918,252 | B2* | 12/2014 | Frojdh | H04M 1/72469 701/41 |
| 9,092,093 | B2* | 7/2015 | Jubner | G06F 3/0421 |
| 9,567,008 | B2* | 2/2017 | Eichhorn | B62D 15/025 |
| 10,007,422 | B2* | 6/2018 | Fröjdh | G06F 3/04883 |
| 10,843,709 | B2* | 11/2020 | Ruemelin | B62D 1/286 |
| 2006/0070795 | A1* | 4/2006 | Meissner | G01C 21/3661 180/446 |
| 2011/0187518 | A1 | 8/2011 | Strumolo et al. | |
| 2014/0111324 | A1 | 4/2014 | Lisseman et al. | |
| 2014/0328077 | A1* | 11/2014 | Tovar | B62D 1/046 362/511 |
| 2016/0052549 | A1* | 2/2016 | Eichhorn | B62D 15/029 701/41 |
| 2016/0185387 | A1* | 6/2016 | Kuoch | B60K 35/00 701/41 |
| 2016/0231743 | A1* | 8/2016 | Bendewald | G05D 1/0061 |
| 2016/0303972 | A1* | 10/2016 | Kühne | G05D 1/0088 |
| 2017/0106786 | A1 | 4/2017 | Ebina | |
| 2017/0166116 | A1* | 6/2017 | Asakawa | B62D 1/06 |

FOREIGN PATENT DOCUMENTS

| | | |
|---|---|---|
| CN | 103764482 A | 4/2014 |
| CN | 104755354 A | 7/2015 |
| CN | 105517873 A | 4/2016 |
| CN | 205273593 U | 6/2016 |
| CN | 106132807 A | 11/2016 |
| DE | 103 52 733 A1 | 10/2004 |
| DE | 10 2007 052 258 A1 | 6/2008 |
| DE | 10 2011 112 134 A1 | 3/2013 |
| DE | 10 2012 221 090 A1 | 5/2013 |
| DE | 10 2013 012 779 A1 | 2/2015 |
| DE | 10 2013 110 852 A1 | 4/2015 |
| DE | 10 2013 019 141 A1 | 5/2015 |
| DE | 10 2014 118 958 A1 | 6/2016 |
| DE | 10 2016 123 786 A1 | 6/2017 |
| EP | 3 124 352 A1 | 2/2017 |
| WO | WO 2014/180713 A1 | 11/2014 |
| WO | WO 2016/014692 A1 | 1/2016 |

OTHER PUBLICATIONS

International Search Report (PCT/ISA/210) issued in PCT Application No. PCT/EP2018/063346 dated Aug. 21, 2018 with English translation (six (6) pages).

German-language Written Opinion (PCT/ISA/237) issued in PCT Application No. PCT/EP2018/063346 dated Aug. 21, 2018 (five (5) pages).

German-language Search Report issued in counterpart German Application No. 10 2017 208 763.3 dated Mar. 22, 2018 with partial English translation (12 pages).

* cited by examiner

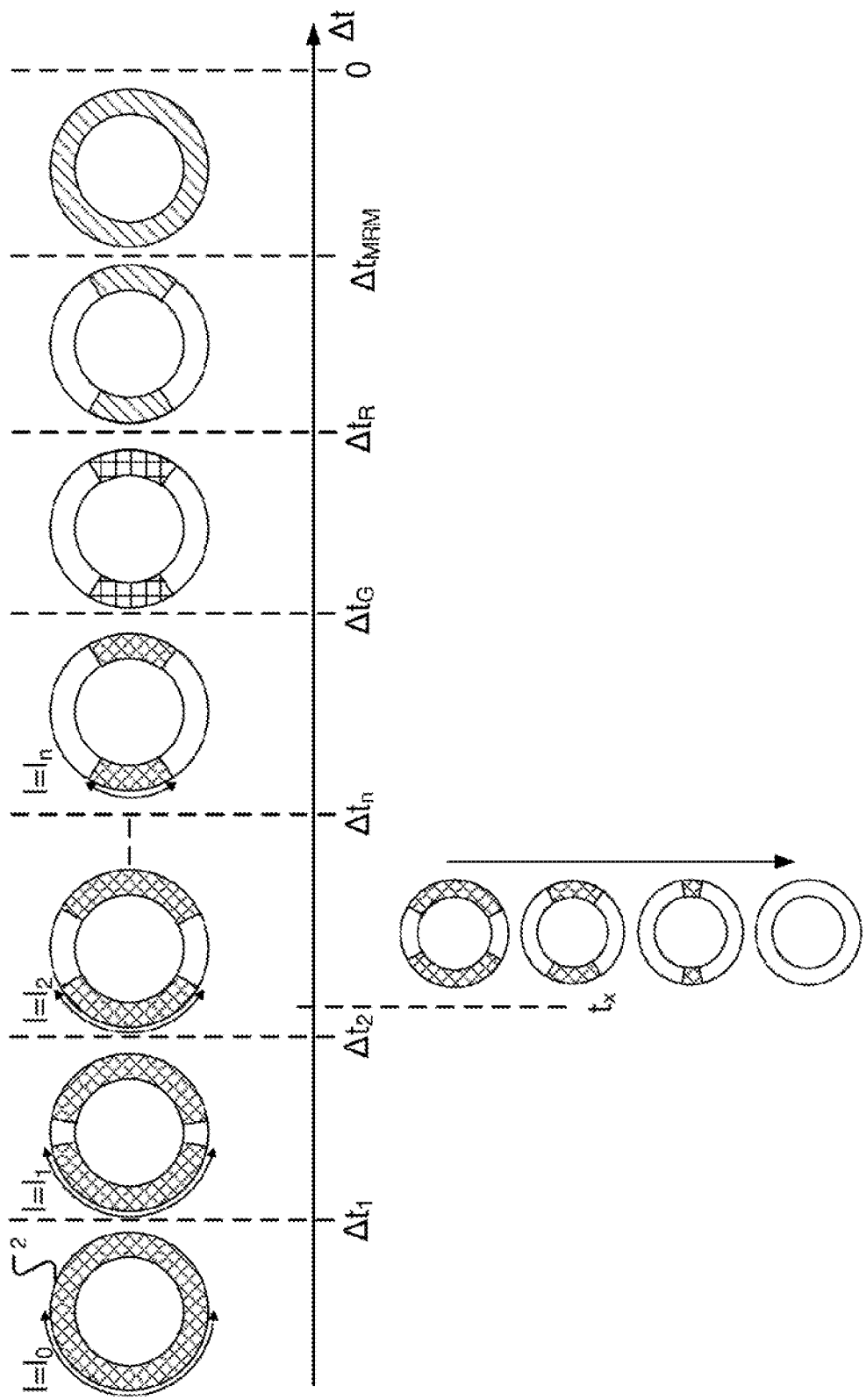

DRIVING SYSTEM FOR AN AUTOMATED DRIVE WITH A STEERING WHEEL DISPLAY FOR DISPLAYING THE DISTANCE TO AN END POINT OF THE AUTOMATED DRIVE, AND METHOD FOR DISPLAYING THE DISTANCE

CROSS REFERENCE TO RELATED APPLICATIONS

This application is a continuation of PCT International Application No. PCT/EP2018/063346, filed May 22, 2018, which claims priority under 35 U.S.C. § 119 from German Patent Application No. 10 2017 208 763.3, filed May 23, 2017, the entire disclosures of which are herein expressly incorporated by reference.

BACKGROUND AND SUMMARY OF THE INVENTION

The invention relates to a driving system for automated driving for a motor vehicle, in particular a passenger car, and to a display method for a driving system for automated driving.

The term "automated driving" within the meaning of this document can be understood to mean driving with automated longitudinal or lateral control or autonomous driving with automated longitudinal and lateral control. Automated driving within the meaning of this application typically refers to driving over a relatively long time, for example on the motorway. The term "automated driving" comprises automated driving with any desired degree of automation, in which a driver must be in a position, before an imminent end of the automated driving, to partially or completely take over the task of driving. Examples of levels of automation are assisted, partially automated, highly automated or fully automated driving, in particular highly automated and fully automated driving. These levels of automation were defined by BASt (Bundesanstalt für Straßenwesen—Federal Highway Research Institute) (see BASt publication "Forschung kompakt," ed. November 2012). In assisted driving, the driver permanently controls longitudinal or lateral control, while the system takes over the respective other tasks to a certain extent. In partially automated driving (PAD), the system takes over longitudinal and lateral control for a specific time period and/or in specific situations, while the driver must permanently monitor the system, as in the case of assisted driving. In highly automated driving (HAD), the system takes over longitudinal and lateral control for a specific time period, without the driver being required to permanently monitor the system; however, the driver must be in a position within a specific time period to take over control of the vehicle. In fully automated driving (FAD), the system can automatically manage driving in all situations for a specific application; no driver is required any more in this application. The aforementioned four levels of automation correspond to SAE levels 1 to 4 of the standard SAE J3016 (SAE—Society of Automotive Engineering). For example, highly automated driving (HAD) corresponds to level 3 of the standard SAE J3016.

Vehicles driving in automated fashion cannot generally do so under all road and environmental conditions.

For example, provision may be made, for a driving system for highly automated driving on the motorway, for the vehicle to be able to drive in highly automated fashion only on road sections of the motorway that are authorized for highly automated driving. Before the end of a currently traveled road section that is authorized for highly automated driving is reached, the driver must generally fully, but at least partially, take over control of the vehicle.

Moreover, the driver in the case of such driving systems for highly automated driving must typically take over control of the vehicle before leaving the motorway for a different type of road.

Therefore, it makes sense to display the end of an automation section so as to prepare the driver for once again taking over control of the vehicle.

It should be ensured that the driver takes over control of the vehicle before the end of the automation section. The transition from automated driving to completely manual or at least partially manual driving should at the same time be as comfortable and confident as possible. In order to ensure this, the remaining kilometers or the estimated remaining time to the end of the automation section can, for example, be presented graphically or using text information in the manner of a countdown in a display. Reference is made in this respect for example to document DE 10 2013 110 852 A1 and document DE 10 2013 019 141 A1.

It is possible that such an optical display, for example on an instrument cluster, is overlooked, in particular if the driver does not permanently monitor the performance of the automated vehicle control as in the case of highly automated driving and is distracted for example by a different activity, such as watching a movie. It is possible that acoustic warnings are missed for the same reason. It is conceivable that haptic warnings, such as vibrating or moving the seat, are not identified or attributed incorrectly.

Document DE 10 2011 112 134 A1 discloses a steering wheel the steering wheel rim of which has light sources. Upon activation of the autonomous driving operation of the vehicle, the light sources of the steering wheel rim are activated.

Document DE 10 2013 012 779 A1 furthermore describes the use of an arcuate light-emitting unit in the steering wheel rim for optically signaling the activation of an automatic driving mode and for optically signaling a request to take over. After the activation of the autonomous driving mode, the steering wheel rim emits for example green light. Upon the transition into the manual driving operation, the steering wheel rim initially continues to emit green light and flashes in the process. If no take-over is effected thereafter, the steering wheel rim emits red light. After the driver has taken over, the steering wheel rim emits blue light.

Document DE 10 2007 052 258 A1 discloses signaling of the state of the lateral control via a light-emitting ring on the steering wheel. If lateral control is deactivated, the light-emitting ring emits red light. In the operational state, the light-emitting ring for example emits yellow light. When transitioning from the deactivated state of the lateral control into the activated state, the light-emitting ring changes to the color green. In the case of a request to take over, the light-emitting ring flashes in red.

It is the object of the invention to notify the driver as to the remaining distance to the end of the automated driving in a manner that is easily perceivable and intuitively understood by the driver.

The object is achieved by the features of the independent patent claims. Advantageous embodiments are described in the dependent claims. It should be pointed out that additional features of a patent claim that is dependent on an independent patent claim can, without the features of the independent patent claim or only in combination with some of the features of the independent patent claim, form a separate invention that is independent of the combination of all the features of the independent patent claim, with said separate invention being able to be made the subject matter of an independent claim, a divisional application or a subsequent application. This applies similarly to technical teachings described in the description that are able to form an invention that is independent of the features of the independent patent claims.

A first aspect of the invention relates to a driving system for automated driving for a motor vehicle. Automated driving refers to automated driving with automated lateral and/or longitudinal control, in particular highly automated driving with automated lateral and longitudinal control.

The driving system comprises a user interface with a steering wheel display having a light band structure. The light band structure is preferably integrated in the steering wheel rim. However, it would also be conceivable for the light band structure to be integrated in the impact module of the steering wheel. Due to the fact that the display is realized on the steering wheel, it can also be perceived well from the corner of the eye.

The light band structure is preferably an arcuate structure, in particular a ring. The ring is advantageously completely closed; however, it would also be conceivable for the light band structure to correspond to a ring that is open in the upper and/or in the lower region.

The light band structure of the steering wheel display is capable of emitting light in a defined color (for example blue) with a length that is variable depending on the actuation. To this end, the light band structure preferably comprises a plurality of light-emitting elements that are arranged one next to the other and have a light-emitting behavior that is preferably individually controllable.

The driving system is set up to control the steering wheel display such that, during automated driving, for example during a highly automated driving operation, the light band structure emits light along a starting length in the (defined) emitted light color, for example blue. In this case, for example, all individual light-emitting elements of the light band structure emit light such that the starting length then corresponds to the maximum light-emitting length. For example, an automation state "highly automated driving active" can be represented by a steering wheel rim that is fully illuminated in blue.

If the light band structure corresponds to a ring, the steering wheel display preferably emits light in the defined color as a ring, for example by virtue of all the light-emitting elements of the light band structure emitting light in this color.

Upon approaching an upcoming end of the automated driving (preferably of the highly automated driving), the driving system at some point determines that the vehicle has approached an upcoming endpoint for automated driving such that a specific approach condition has been met.

For example, the approach condition corresponds to the condition that the length-related or time distance from the current vehicle position to an endpoint for automated driving is less than, or less than or equal to, a specific threshold value, for example a threshold value in the range from 20 s to 10 min (for example 1 min) in the case of a time distance or for example a threshold value in the range from 1000 m to 30 km (for example 3 km) in the case of a length-related distance.

The approach condition can refer to an endpoint of the section behind which the driving section is no longer authorized for automated driving. The approach condition can alternatively for example also refer to a point located before then, up to which the driving task must in fact have been transferred to the driver.

Information relating to the end can be stored for example in an electronic map in the vehicle or be received via the cellular network.

Provided target control of the navigation system is active in the vehicle and the vehicle drives along a route calculated by the navigation system, the vehicle can notify the driver not only about an endpoint for automated driving that is situated on the currently traveled road (for example motorway) upon continued driving, but also about endpoints for automated driving that will come up along the route if the currently traveled road is changed.

When the system has determined that the vehicle has approached the end of automated driving such that the condition has been met, the steering wheel display is controlled such that, with successively decreasing distance to the endpoint for automated driving, the light band structure emits light in the emitted light color starting from the starting length with successively decreasing length so as to prepare the driver for once again fully or at least partially taking over control of the vehicle. When the vehicle approaches the end of the automated section, the length of the region of the light band structure that is illuminated in the emitted light color (for example blue) is increasingly reduced until the emitted light color has vanished, for example, upon reaching of a critical take-over time point. The display can then also enter a phase of more intense warning by taking further measures such as color change, flashing, etc. Reducing the steering wheel illumination takes place for example in a manner similar to a countdown that represents the estimated remaining time or the remaining distance to the take-over time point. Such a countdown can also be displayed in parallel on a screen.

The fact that the display is realized on the element (specifically the steering wheel) on which the driver generally performs the taking-over of the driving task (by way of the driver taking hold of the steering wheel) makes a display concept possible that is highly intuitive for the driver.

The display concept according to the invention permits very clear, intuitively interpretable representation of the remaining margin until the driver is required at the latest to take over the driving task. This provides better comfort, confidence and safety.

The light band structure is preferably a substantially symmetric structure having a left and a right half, in particular a left and a right half of a ring.

The driving system is in this case preferably set up to control the steering wheel display such that, in the case of a successively decreasing distance to the endpoint for automated driving, the left and the right half of the light band structure each emit the emitted light color (for example blue) with successively decreasing length, beginning with half the starting lengths (for example the lengths of the ring halves on the left and right in the case of a ring). The decrease is realized here in a manner such that the illumination in the emitted light color (for example blue) decreases starting from the upper and/or lower region of the light band structure (for example starting from the upper and lower region of a light-emitting ring).

If the light band structure is integrated in the steering wheel rim, the length along which the left and right halves of the light band structure emit light in the emitted light color (for example blue) can be reduced to a defined minimum length in dependence on the distance from the endpoint of automated driving. The regions of minimum length in the left and right halves that emit light in the emitted light color then in each case mark a contact region for touching the steering wheel. That is to say, the regions on the steering wheel rim where the hands of the driver should be positioned to ensure his or her capability of taking over are marked. When the driver then fails to take over the driving task, the color of these light-emitting regions can furthermore be changed to a color having a stronger warning character (for example orange or red) to intensify the warning. Alternatively or additionally, it is possible to change from permanent light emission to flashing light emission.

Using a corresponding hands-on detection apparatus it is possible to ascertain whether the driver in fact puts his or her hands on the steering wheel (preferably it is even possible to ascertain whether the driver positions his or her hands at the marked regions) so as to set, upon confirmation, the request to take over by way of the light signal in the steering wheel display and to hereby signal that the driving task has now been taken over. To this end, for example hands-on sensor technology that is integrated in the steering wheel can be used, for example capacitive hands-on sensor technology.

As a reaction to the hands being placed on the steering wheel, the length along which the light band structure emits light in the emitted light color is preferably reduced to zero and the automation is ended (or at least partially ended) to signal to the driver the (full or partial) transfer of the driving task to the driver. As a reaction to the placement of the hands, the remaining length of the emitted light color (for example the remaining blue) is preferably reduced faster (as compared to the decrease in length that took place previously). The decrease in length to zero can optionally depend not only on the condition of the placement of the hands on the steering wheel, but also on one or more additional conditions, for example on the driver looking at the traffic ahead (this can be ascertained using camera-based driver monitoring).

The length along which the light-emitting structure emits light preferably decreases incrementally upon approaching the endpoint for automated driving. To this end, for each point from a plurality of successive defined points on the section before the endpoint, the reaching of a respective point along the section before the endpoint is ascertained. After a respective point has been reached, the length along which the light band structure emits light in the emitted light color is in each case reduced. Synchronously with the reaching of the individual points, the length along which the light band structure emits light in the emitted light color can be reduced.

The points can be time-based points or length-based points, defined for example with respect to an endpoint for automated driving.

If for example n points are provided, the length along which the light band structure emits light in the emitted light color is preferably reduced in n steps.

For example, at least three time points $\Delta t_1$ before the endpoint (for example $\Delta t_1=60$ s), $\Delta t_2$ before the endpoint (for example $\Delta t_2=40$ s) and $\Delta t_3$ before the endpoint (for example $\Delta t_3=20$ s) are defined. The length of a closed light-emitting ring is reduced for example for the first time after reaching the point $\Delta t_1$, the second time after reaching the point $\Delta t_2$, and the third time after reaching the point $\Delta t_3$.

If the points have a predefined temporal distance from one another and from the endpoint, the reduction in length is always equally fast even in the case of different speeds. This has the advantage that the reduction in length is more relatable for the driver.

In this case, preferably a speed estimation for the upcoming road section is performed. In the speed estimation, for example an average speed or a speed profile can be determined. The speed estimation can be continuously updated.

Based on the distance from the endpoint for automated driving and on the speed estimation, the anticipated time duration until the reaching of the endpoint for automated driving can be estimated. This anticipated time duration can be compared to the predefined time points to ascertain whether a predefined time point has been reached.

Alternatively, the time points can also be converted into location points along the section based on the speed estimation. It is then possible to use the navigation system to check whether such a location point has been reached.

A second aspect of the invention relates to a method for notifying the driver of a motor vehicle about an upcoming end of automated driving. The motor vehicle comprises a driving system for automated driving, in particular for highly automated driving. Furthermore, a steering wheel display having a light band structure, which was already described above, is provided. The method comprises the following steps:

controlling the steering wheel display such that, during automated driving, the light band structure emits light of the emitted light color along a starting length, for example as a closed ring having maximum length;

ascertaining that the vehicle has approached an upcoming endpoint for automated driving such that a specific approach condition has been met; and as a reaction thereto, controlling the steering wheel display such that, in the case of a successively decreasing distance from the endpoint for automated driving, the light band structure emits light in the emitted light color with successively decreasing length, beginning with the starting length, to prepare the driver for once again fully or at least partially taking over control of the vehicle.

The above statements relating to the driving system according to the invention as per the first aspect of the invention analogously also apply to the method according to the invention as per the second aspect of the invention. Advantageous exemplary embodiments of the method according to the invention that are not described explicitly at this point and in the patent claims correspond to the advantageous exemplary embodiments of the driving system according to the invention that were described previously or are described in the patent claims.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 3 shows an exemplary sequence of display states of the steering wheel display over the temporal distance $\Delta t$ to the endpoint of the automation section.

DETAILED DESCRIPTION OF THE DRAWINGS

Figure 1:
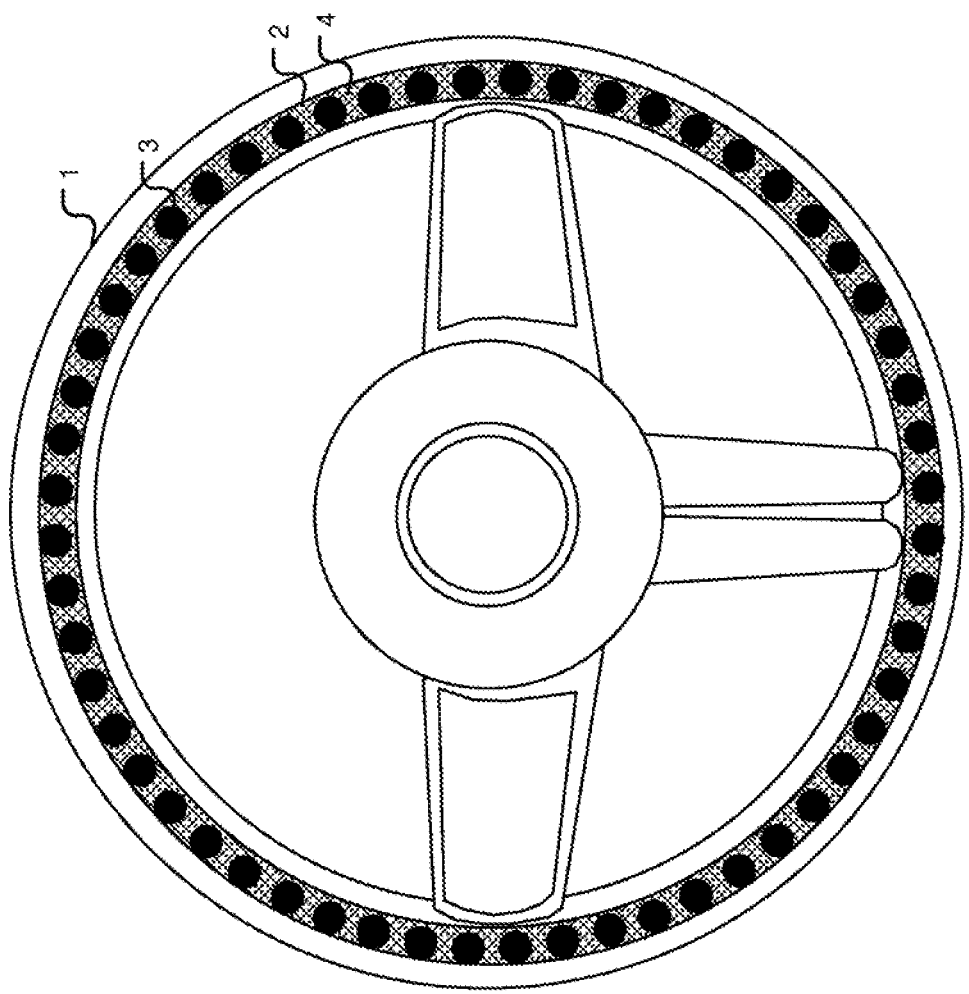
FIG. 1 shows an exemplary embodiment of a steering wheel having a steering wheel display.

FIG. 1 illustrates an exemplary embodiment of a steering wheel 1 having a steering wheel display. The steering wheel display has a light band structure 2 in the form of a ring, which is integrated in the steering wheel rim. The light band structure 2 comprises a chain of light-emitting elements 3 of the same type which are arranged one next to the other. The light-emitting elements 3 are for example light-emitting diodes (LEDs). Each light-emitting element 3 can comprise one or more light-emitting diodes, for example two or three diodes, in particular in the case of a light-emitting element 3 which is capable of emitting different emitted light colors.

The light-emitting elements 3 are preferably arranged behind a light-transmissive layer 4 that is embedded in the steering wheel rim and through which light is output.

The light-emitting elements 3 can preferably be actuated individually. It is advantageous if the light-emitting elements 3 can emit light of different colors, for example blue, yellow and red.

Depending on the distance, number of the light-emitting elements 3 and scattering of the light, the luminous character can range from a substantially homogeneous illumination in the region of the active light-emitting elements 3 to a rather loose chain of light-emitting points.

The steering wheel display is part of a user interface of an exemplary driving system for automated driving. The driving system has a driving mode for highly automated driving with automated longitudinal and lateral control, for example for driving on the motorway. Furthermore, further driving modes with a lower level of automation are conceivable, for example a driving mode for partially automated driving with automated longitudinal and lateral control, and a driving mode for assisted driving with automated longitudinal control and/or a different driving mode for assisted driving with automated lateral control. The example described below with reference to the driving mode for highly automated driving is also transferable to other levels of automation.

Figure 2:
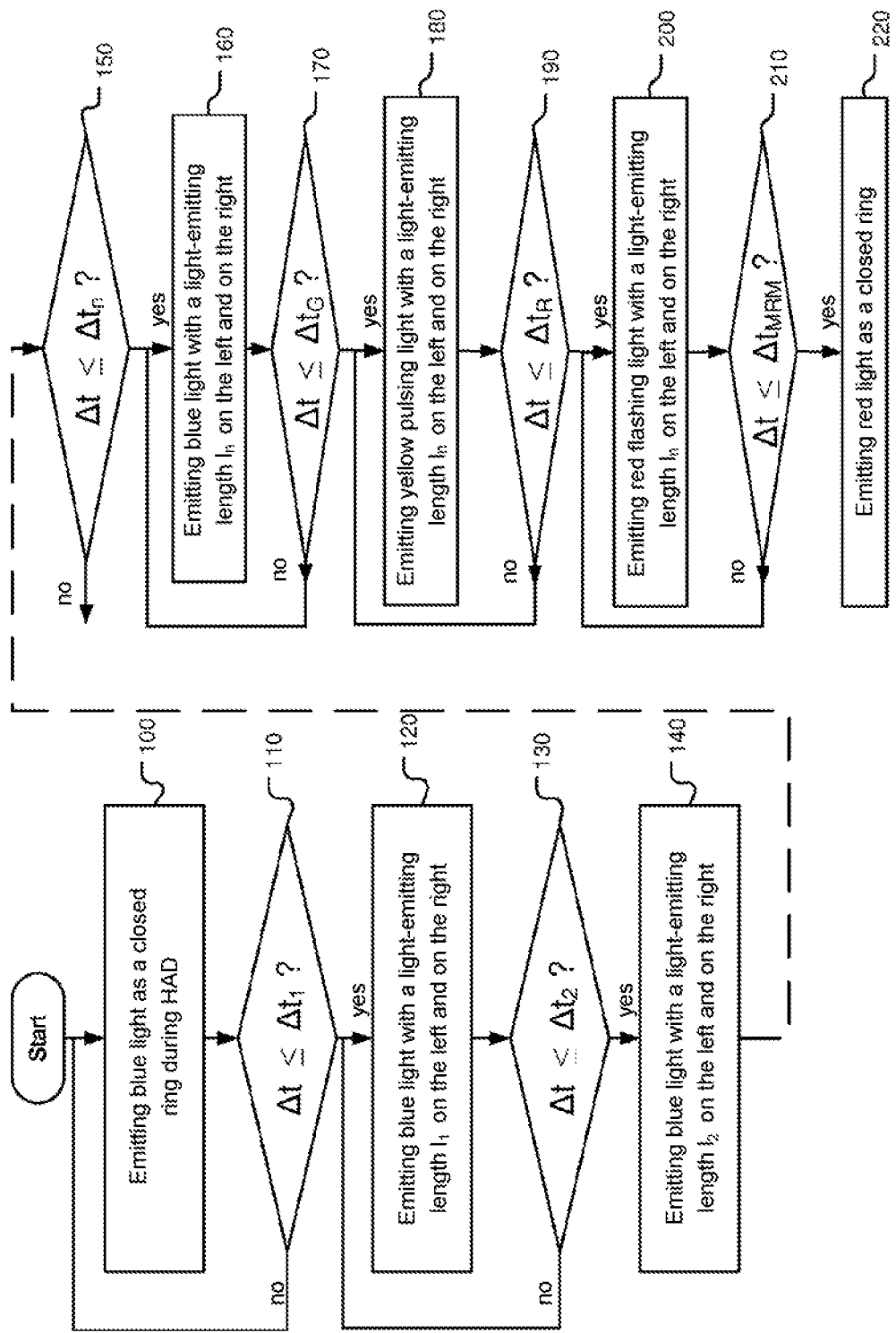
FIG. 2 is an exemplary flowchart for controlling the steering wheel display.

An exemplary sequence of the steering wheel display with decreasing remaining distance to an endpoint for highly automated driving will be illustrated below in conjunction with FIG. 2 and FIG. 3.

The sequence starts with a state in which the driving mode for highly automated driving is active and the longitudinal and lateral control of the vehicle is performed by the driving system. In this state, the light band structure emits light as a closed ring in a first color that is assigned to highly automated driving due to a corresponding actuation of the steering wheel display (see step 100); for this purpose, all the light-emitting elements 3 emit light in the first emitted light color, for example blue. The length of the right and left light-emitting regions of the ring is in each case $l_0$. This is preferably a permanent emission of light.

Based on the section distance $\Delta s$ to a known endpoint for highly automated driving and a prognosis relating to the speed up to the endpoint, the current time distance $\Delta t$ to the endpoint for highly automated driving is continually estimated.

For controlling the steering wheel display, fixed time distances $\Delta t_1, \Delta t_2, \ldots, \Delta t_{n-1}, \Delta t_n, \Delta t_G, \Delta t_R, \Delta t_{MRM}$ to the endpoint for highly automated driving are predefined with n>2, wherein the following relationship applies:

$$\Delta t_1 > \Delta t_2 > \Delta t_{2+1} \ldots > \Delta t_{n-1} > \Delta t_n > \Delta t_G > \Delta t_R > \Delta t_{MRM}$$

The variable n indicates the number of steps with which the length of the regions emitting light of the first emitted light color is reduced, for example 5 steps.

Per reduction step, a defined number of the uppermost and lowermost light-emitting elements 3 that still emit light of the first emitted light color before the respective length reduction are switched off. Alternatively, it would also be possible for these light-emitting elements 3 to switch to a different emitted light color. The decrease in length takes place in the same way for the left and right side of the light-emitting display. The decrease from the top and the bottom can be substantially symmetric; however, this is not necessary.

After the current time distance $\Delta t$ has become less than or equal to the specified time distance $\Delta t_1$ (see interrogation 110 in FIG. 2), the light-emitting length l with which the left and right part of the steering wheel display emits blue light is reduced to the length $l=l_1$ (see FIG. 3 and step 120 in FIG. 2) by switching off a defined set of the uppermost and lowermost light-emitting elements 3 emitting light in the first emitted light color. With the reduction in length, it would also be possible to switch from permanent light emission to flashing light emission.

After the current time distance $\Delta t$ has become less than or equal to the specified time distance $\Delta t_2$ (see interrogation 130 in FIG. 3), the light-emitting length l with which the left and right part of the steering wheel display emits light in the first emitted light color is reduced to the length $l=l_2$ (see FIG. 3 and step 140) by switching off a further defined set of the uppermost and lowermost light-emitting elements 3 emitting light in the first emitted light color.

If the driver does not take over the driving task, the length is successively reduced with reaching of the individual time distances $t_i$ until the length l with which the left and right part of the steering wheel display emits light of the first emitted light color is reduced to the minimum length $l=l_n>0$ (see step 160) after the time distance $\Delta t_n$ to the endpoint for automated driving was reached (see the interrogation 150). Alternatively, it would also be possible for the length to be successively reduced to zero upon reaching the individual time distances $t_i$.

The region of minimum length $l_n$ of the left and the right half that emits light in the emitted light color marks the contact region for touching the steering wheel.

If the driver does not take over the driving task, the emitted light color is switched, after reaching the time distance $\Delta t_G$ (see interrogation 170), from the first emitted light color to a second emitted light color (see step 180) having a higher warning character as compared to the first emitted light color (for example to the color yellow). The length $l_n$ is maintained in this case. If the length l in the alternative configuration was already reduced to zero previously, the length is correspondingly increased. The light emission is preferably pulsed.

If the driver does not take over the driving task, the emitted light color, after reaching the time distance $\Delta t_R$ (see interrogation 190), is switched from the second emitted light color to a third emitted light color (see step 200) having a higher warning character as compared to the second emitted light color (for example to the color red). The length $l_n$ is maintained in this case. The light emission is preferably a flashing emission.

If the driver does not take over the driving task, the steering wheel display, after reaching the time distance $\Delta t_{MRM}$ (see interrogation 210), is actuated such that the light-emitting ring emits light of the second emitted light color as a closed ring (see step 220). This emission of light is preferably a permanent emission. Provision is preferably made for the vehicle to then perform an emergency stop maneuver.

It was assumed above that the time distance $\Delta t$ is initially greater than $\Delta t_1$. However, if it is determined only after the time distance $\Delta t_1$ has been reached that an end of the automation is coming up, the light-emitting state associated with the time distance $\Delta t$ is taken over and then, with further decrease in the time distance, the light-emitting state is changed according to the previous description. If the remaining time duration for the light-emitting state falls below a specific level, it is possible to directly wait for the light-emitting state that follows in the sequence or to correspondingly switch over earlier directly into said light-emitting state.

If, beginning with the starting length $l_0$, a light-emitting state with light emission of a first color and a reduced light-emitting length $l_i$ is to be taken over, the light-emitting length can be reduced incrementally, beginning with the starting length $l_0$, to the target length $l_i$ in quick succession.

At least after reaching the time distance $\Delta t_1$, the driver can take over the driving task by placing his or her hands on the steering wheel 1. Using hands-on sensor technology in the steering wheel, the point at which the driver puts his or her hands on the steering wheel 1 is detected. As a reaction thereto, the remaining regions of the steering wheel display that emit light of the first emitted light color are reduced to zero in quick succession and the driving task is transferred to the driver. This reaction can be dependent on whether one or more optional further conditions have been met, for example whether the driver is looking at the traffic situation ahead. The rapid decrease to zero signals to the driver the transfer of the driving task to the driver.

FIG. 3, in the lower region of the diagram, illustrates an exemplary behavior of the steering wheel display when the driver at the time point $t_x$ puts his or her hands on the steering wheel to take over the driving task.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A driving system for automated driving for a motor vehicle, the driving system comprising:
   a steering wheel display having a light band structure, wherein the light band structure is capable of emitting light in an emitted light color with a length that is variable depending on actuation,
   wherein the driving system is operatively configured to:
   control the steering wheel display such that, during automated driving, the light band structure emits light of the emitted light color along a starting length;
   determine that the vehicle has approached an upcoming endpoint for automated driving such that a specific approach condition has been met; and
   as a reaction thereto, control the steering wheel display such that, in the case of a successively decreasing distance from the endpoint for automated driving, the light band structure emits light in the emitted light color with successively decreasing length, beginning with the starting length, to prepare the driver for once again fully or at least partially taking over control of the vehicle.

2. The driving system for automated driving according to claim 1, wherein
   the light band structure is integrated in the steering wheel rim.

3. The driving system for automated driving according to claim 1, wherein
   the light band structure corresponds to a ring, and the driving system is further configured to control the steering wheel display such that the light band structure emits light as a ring during automated driving.

4. The driving system for automated driving according to claim 1, wherein
   the light band structure has a left and a right part, and the driving system is further configured to:
   control the steering wheel display such that, in the case of a successively decreasing distance to the endpoint for automated driving, the left and the right part of the light band structure each emit the emitted light color with successively decreasing length, wherein illumination in the emitted light color decreases starting from an upper and/or lower region of the light band structure.

5. The driving system according to claim 4, wherein
   the light band structure is integrated in the steering wheel rim, and
   the driving system is further configured to reduce the respective length along which the left and right parts of the light band structure emit light in the emitted light color to a defined minimum length, wherein the regions of minimum length of the left and right parts that emit light in the emitted light color in each case mark the contact region for touching the steering wheel.

6. The driving system for automated driving according to claim 1, wherein the driving system is further configured to:
   determine, for each point from a plurality of successive defined points on the section before the endpoint, the reaching of a respective point along the section before the endpoint, and
   after a respective point has been reached, reduce in each case the length along which the light band structure emits light in the emitted light color.

7. The driving system according to claim 6, wherein
   the points are situated at a predefined temporal distance with respect to one another and to the endpoint.

8. The driving system according to claim 1, wherein the driving system is further configured to:
   determine that a driver puts his or her hands back on the steering wheel,
   as a reaction thereto, reduce the length along which the light band structure emits light in the emitted light color to zero so as to signal to the driver the transfer of the driving task to the driver.

9. The driving system according to claim 1, wherein the driving system is further configured to:
   determine that a driver puts his or her hands back on the steering wheel,
   as a reaction thereto, reduce the length along which the light band structure emits light in the emitted light color faster as compared to the distance dependent reduction in length so as to signal to the driver the transfer of the driving task to the driver.

10. The driving system according to claim 4, wherein the left and right parts are parts of a ring.

11. A method for notifying a driver of a motor vehicle about an upcoming end of automated driving, wherein the motor vehicle comprises a driving system for automated driving which comprises:
    a steering wheel display having a light band structure, wherein the light band structure is capable of emitting light in an emitted light color with a length that is variable depending on actuation,
    the method comprising the steps of:
    controlling the steering wheel display such that, during automated driving, the light band structure emits light of the emitted light color along a starting length;

determining that the vehicle has approached an upcoming endpoint for automated driving such that a specific approach condition has been met; and as a reaction thereto, controlling the steering wheel display such that, in the case of a successively decreasing distance from the endpoint for automated driving, the light band structure emits light in the emitted light color with successively decreasing length, beginning with the starting length, to prepare the driver for once again fully or at least partially taking over control of the vehicle.

* * * * *